US008105681B2

(12) United States Patent
Tanimoto et al.

(10) Patent No.: US 8,105,681 B2
(45) Date of Patent: Jan. 31, 2012

(54) COMPOSITION, TRANSFER SHEET, MELAMINE DECORATIVE BOARD, AND METHOD FOR PRODUCING MELAMINE DECORATIVE BOARD

(75) Inventors: Naoshi Tanimoto, Ama-gun (JP); Tomohiro Yamamoto, Ama-gun (JP); Takaharu Ito, Ama-gun (JP); Katsumi Honma, Ama-gun (JP)

(73) Assignee: Aica Kogyo Co., Ltd. (JP)

( * ) Notice: Subject to any disclaimer, the term of this patent is extended or adjusted under 35 U.S.C. 154(b) by 0 days.

(21) Appl. No.: 12/667,316

(22) PCT Filed: May 23, 2008

(86) PCT No.: PCT/JP2008/059565

§ 371 (c)(1), (2), (4) Date: Dec. 30, 2009

(87) PCT Pub. No.: WO2009/008224

PCT Pub. Date: Jan. 15, 2009

(65) Prior Publication Data

US 2010/0190903 A1 Jul. 29, 2010

(30) Foreign Application Priority Data

Jul. 10, 2007 (JP) ................................ 2007-180521
Jul. 27, 2007 (JP) ................................ 2007-195470

(51) Int. Cl.
*C08K 5/54* (2006.01)
*B32B 37/00* (2006.01)

(52) U.S. Cl. .......................... 428/220; 524/261; 156/60

(58) Field of Classification Search .................. 524/261; 156/60; 428/212
See application file for complete search history.

(56) References Cited

U.S. PATENT DOCUMENTS

2002/0197485 A1* 12/2002 Nishikawa et al. ........ 428/423.1
2004/0225057 A1* 11/2004 Anderson et al. ............ 524/588
2007/0015074 A1* 1/2007 Sugino et al. ................ 430/59.6

FOREIGN PATENT DOCUMENTS

JP 6-199528 7/1994

(Continued)

OTHER PUBLICATIONS

Machine English_Translation_JP_2006169328_A; Kano; Photosensitive Resin Composition and Film Having Its Cured Coating; Jun. 29, 2006; JPO; whole document.*

(Continued)

*Primary Examiner* — David Sample
*Assistant Examiner* — Tahseen N Khan
(74) *Attorney, Agent, or Firm* — Grossman Tucker Perreault & Pfleger PLLC

(57) ABSTRACT

A composition of the present invention includes an organosilica sol; and a siloxane graft-type polymer obtained by compositing fluorine resin or acrylic resin with siloxane and/or a cold glass coating agent. A melamine decorative board of the present invention includes a low refractive index layer formed on a surface thereof. The low refractive index layer is composed of a cured product of the composition.

7 Claims, 2 Drawing Sheets

1
1a
1b
2
3
4
4
4
4
4

FOREIGN PATENT DOCUMENTS

| | | | | |
|---|---|---|---|---|
| JP | 2003048280 | | | 2/2003 |
| JP | 2004291262 | | | 10/2004 |
| JP | 2005146272 | | | 6/2005 |
| JP | 2005199495 | | | 7/2005 |
| JP | 2006169328 | | | 6/2006 |
| JP | 2006169328 | A | * | 6/2006 |
| JP | 2006348061 | | | 12/2006 |

OTHER PUBLICATIONS

International Preliminary Examination Report from corresponding PCT Application No. PCT/JP2008/059565 dated Jan. 26, 2010.

International Search Report from corresponding PCT Application No. PCT/JP2008/059565.

Examiner's First Report from corresponding Australian Application No. 2008273559 dated Jul. 21, 2011.

* cited by examiner

COMPOSITION, TRANSFER SHEET, MELAMINE DECORATIVE BOARD, AND METHOD FOR PRODUCING MELAMINE DECORATIVE BOARD

TECHNICAL FIELD

This invention relates to a composition, a transfer sheet, a melamine decorative board, and a method for producing the melamine decorative board.

BACKGROUND ART

A melamine decorative board is used as a horizontal surface for a counter, a desk, and others because of its excellent properties in surface hardness, heat resistance, abrasion resistance and the like. The melamine decorative board is generally obtained by stacking a melamine resin impregnated pattern paper and a phenol resin impregnated core paper, and then applying heat and pressure to the stacked papers with a flat plate pressing machine (see Patent Documents 1-3). The melamine resin impregnated pattern paper is obtained by impregnating a pattern base paper for decorative board with a resin liquid composed primarily of melamine-formaldehyde resin and drying the impregnated pattern base paper. The phenol resin impregnated core paper is obtained by impregnating a kraft paper with a resin liquid composed primarily of phenol-formaldehyde resin and drying the impregnated kraft paper.

Patent Document 1: Unexamined Japanese Patent Publication No. H06-199528

Patent Document 2: Unexamined Japanese Patent Publication No. 2005-199495

Patent Document 3: Unexamined Japanese Patent Publication No. 2005-146272

DISCLOSURE OF THE INVENTION

Problems to be Solved by the Invention

The melamine decorative board has excellent surface hardness, heat resistance, abrasion resistance and the like by virtue of characteristics of the resin used therein. On the other hand, the melamine decorative board is disadvantageous in that a greasy dirt such as a sebum membrane of a fingerprint (hereinafter referred to as a fingerprint) adhering onto a surface of the melamine decorative board is easily noticeable. A further disadvantage is that a pattern on a printed paper cannot be clearly exhibited due to reflection of lights and white blur on a melamine resin layer.

The present invention was made in order to overcome such conventional disadvantages. It is an object of the present invention to provide a composition which can be used in producing a melamine decorative board on which a fingerprint and the like is less noticeable and a pattern on a printed paper can be clearly exhibited; a transfer sheet which can be used in producing the melamine decorative board; the melamine decorative board; and a method for producing the melamine decorative board.

Means to Solve the Problems

A composition of the present invention includes (a) an organosilica sol; and (b1) a siloxane graft-type polymer obtained by compositing fluorine resin or acrylic resin with siloxane and/or (b2) a cold glass coating agent.

In other words, there are three different types of the composition in the present invention, that is, a composition including the component (a) and the component (b1), a composition including the component (a) and the component (b2), and a composition including the component (a), the component (b1), and the component (b2).

The composition of the present invention can be used, for example, for forming a low refractive index layer composed of a cured product of the composition of the present invention on a surface of a melamine decorative board. In the melamine decorative board having the low refractive index layer, which is composed of the cured product of the composition of the present invention, formed on the surface thereof, a fingerprint adhering on the surface is less noticeable. This is because the low refractive index layer has a lower refractive index than that of a melamine resin layer and, therefore, a refractive index difference between an adhering fingerprint and the low refractive index layer is smaller than that between an adhering fingerprint and the melamine resin layer. Furthermore, the low refractive index layer has a low reflectivity and a low refractive index, thereby reducing reflection of lights and white blur. As a result, a pattern on a printed paper used for the melamine decorative board can be clearly exhibited to provide the melamine decorative board with high design quality.

In the decorative board of the present invention, since the low refractive index layer composed of the cured product of the above-described composition is formed on the surface, the fingerprint adhering on the surface is less noticeable, and the pattern on the printed paper is clearly exhibited, whereby the high design quality is realized. The low refractive index layer preferably has a refractive index of 1.5 or less. By setting the refractive index to 1.5 or less, the fingerprint becomes still less noticeable and the pattern on the printed paper is exhibited more clearly.

A transfer sheet of the present invention includes a base material and the above-described composition disposed on the base material. The transfer sheet can be used for forming the low refractive index layer on the surface of the melamine decorative board. The transfer sheet makes it easy to form the low refractive index layer.

A method for producing the melamine decorative board of the present invention includes steps of stacking the above-described transfer sheet, a melamine resin impregnated paper, and a core material, applying heat and pressure thereto, and removing the base material of the transfer sheet. According to the method, the melamine decorative board having the low refractive index layer on the surface thereof can be easily produced. While applying heat and pressure, temperature is preferably in a range of 110-180° C., and pressure is preferably in a range of 5-10 MPa.

EXPLANATION OF REFERENCE NUMERALS

Figure 1:
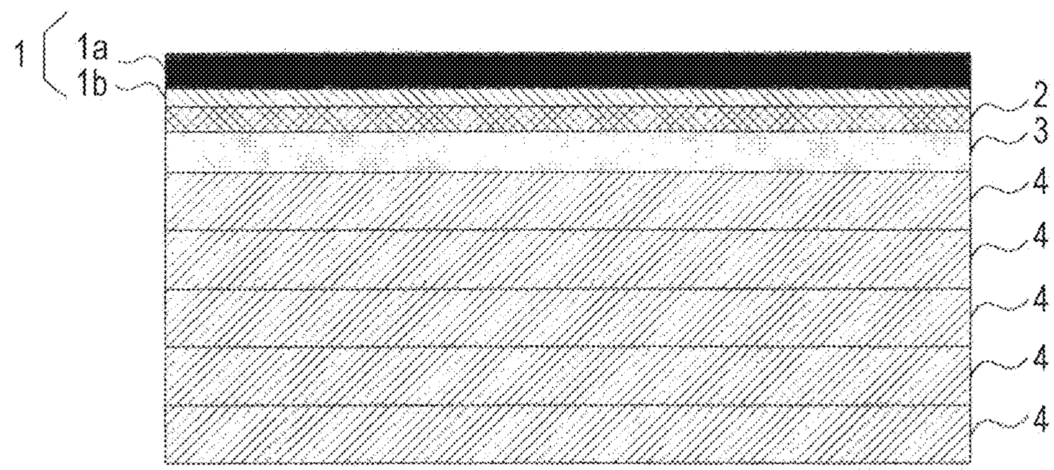
FIG. 1 is an explanatory view showing a method for producing a melamine decorative board.

1, 11 . . . transfer sheet, 1*a* . . . OPP film, 1*b* . . . dried film, 2 . . . melamine resin impregnated overlay paper, 3 . . . melamine resin impregnated decorative paper, 4 . . . phenol resin impregnated core paper, 5 . . . melamine decorative board, 6 . . . low refractive index layer

BEST MODE FOR CARRYING OUT THE INVENTION

Hereinafter, the present invention will be described in detail. A siloxane graft-type polymer (a component (b1)) used in a composition of the present invention is obtained by compositing fluorine resin or acrylic resin with siloxane. Specifically, the siloxane graft-type polymer can be obtained by copolymerizing following components: (A) 2-70% by weight of organic solvent-soluble fluorine resin having radical polymerizable unsaturated bond via urethane bond, (B) 4-40% by weight of polysiloxane which is radical polymerizable at one end shown by a following formula 1 (wherein $R^1$ represents a hydrogen atom or a hydrocarbon group having 1-10 carbon atoms; $R^2$, $R^3$, $R^4$, $R^5$, and $R^6$, which may be mutually same or different, represent a hydrogen atom or a hydrocarbon group having 1-10 carbon atoms; and n represents an integer of 2 or more), and/or polysiloxane which is radical polymerizable at one end shown by a following formula 2 (wherein $R^7$ represents a hydrogen atom or a hydrocarbon group having 1-10 carbon atoms; $R^8$, $R^9$, $R^{10}$, $R^{11}$, and $R^{12}$, which may be mutually same or different, represent a hydrogen atom or a hydrocarbon group having 1-10 carbon atoms; p represents an integer of 0-10; and q represents an integer of 2 or more), and (C) 15-94% by weight of radical polymerizable monomer which is unreactive to the component (A) under radical polymerization reaction condition, except polymerization reaction with a double bond.

[Formula 1]

(1)

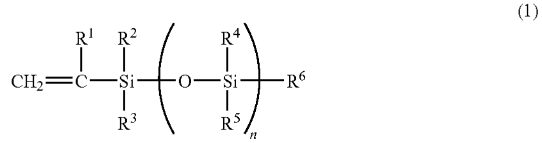

[Formula 2]

(2)

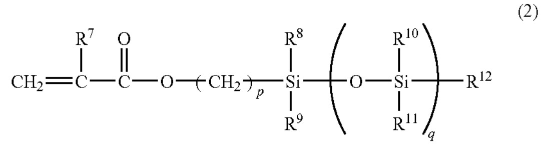

Another example of the siloxane graft-type polymer obtained by compositing fluorine resin or acrylic resin with siloxane includes a polymer which is obtained by copolymerizing following components: (A) 2-70% by weight of organic solvent-soluble fluorine resin having radical polymerizable unsaturated bond via urethane bond, (B) 5-55% by weight of polysiloxane which is radical polymerizable at one end shown by the above formula 1, and/or polysiloxane which is radical polymerizable at one end shown by the above formula 2, (C) 5-55% by weight of monomer having an alkoxysilyl group, (D) 15-50% by weight of monomer having a hydroxyl group, and (E) 0-73% by weight of monomer having a functional group which is unreactive to the above components (A)-(D) except radical polymerization.

Still another example of the siloxane graft-type polymer obtained by compositing fluorine resin or acrylic resin with siloxane includes a polymer in which an acrylic-type (co) polymer containing a curable group, having radical polymerizable unsaturated bond via urethane bond and also being soluble in organic solvent, is used in place of the component (A) in each of the above-described siloxane graft-type polymers.

Commercially available siloxane graft-type polymer obtained by compositing fluorine resin or acrylic resin with siloxane includes ZX-007C, ZX-001, ZX-022, ZX-022H, ZX-028R, ZX-036 (all are manufactured by Fuji Kasei Kogyo Co., Ltd.) and the like.

A cold glass coating agent (a component (b2)) used in the composition of the present invention includes one which is obtained by ionizing alcohol-soluble organosilicon compound in a solution composed of water and organic solvent, and adding thereto halogen and boron as catalysts.

A role of $B^{3+}$ ion is to inhibit a decrease in an amount of $SiO_2$ due to generation and volatilization of $SiF_6$ by reacting with $F^-$ ion. $B^{3+}$ ion reacts with $F^-$ ion to generate $BF_4^-$ complex ion, and B in the $BF_4^-$ complex ion is replaced extremely easily by Si in $Si(OR)_n$ to obtain $SiF^-_{n+1}$ complex ion. Hydrolysis and dehydrating condensation represented by the formulae below are accelerated, and as a result, metal-oxide glass is obtained at an ambient temperature range. Residual $B^{3+}$ ion is vaporized and disappears as $B(OCH_3)_3$ by the presence of methanol ($CH_3^+$), and $F^-$ ion is vaporized and disappears as HF by catalytic reaction with $OH^-$ group or others contained in the base material and the like. Here, R represents an alkyl group, M represents a metal, and X represents halogen.

$$B^{3+}+4X^-\rightarrow BX_4^-$$

$$M(OR)_n+BX_4^-+n/2H_2O\rightarrow MX^-_{n+1}+nROH+B^{3+}$$

$$MX^-_{n+1}+nH_2O\rightarrow M(OH)_n+(n+1)X^-$$

$$M(OH)_n\rightarrow \text{metal-oxide glass}+H_2O$$

An example of a compound releasing boron ion $B^{3+}$ includes, for example, trialkoxyboran $B(OR)_3$, among which triethoxyboran $B(OEt)_3$ is preferable. Concentration of $B^{3+}$ ion in a reaction solution is preferably in a range of 1.0-10.0 mol/liter. Halogen ion is preferably $F^-$, $Cl^-$, or a mixture of $F^-$ and $Cl^-$. A compound used as halogen ion source may be any one which produces $F^-$ ion or $Cl^-$ ion in the reaction solution. As $F^-$ ion source, for example, ammonium hydrogen fluoride $NH_4F.HF$, sodium fluoride NaF, and the like are preferable. As $Cl^-$ ion source, for example, ammonium chloride $NH_4Cl$ and the like are preferable.

Commercially available cold glass coating agent includes Siragusital A6200, Siragusital B4373(BN) (both are manufactured by Bokuto Kasei Kogyo Co., Ltd.), and the like.

An organosilica sol used in the composition of the present invention includes, for example, a colloidal solution including colloidal silicas with a particle diameter of 1-40 nm (more preferably with a diameter of 7-30 nm) stably dispersed in organic solution. A silica concentration is preferably in a range of 1-50% by weight, more preferably 40% by weight or less to inhibit gelation.

Commercially available organosilica sol includes IPA-ST, IPA-ST-ZL, methanol silica sol, NPC-ST-30, EG-ST, DMAC-ST and the like manufactured by Nissan Chemical Industries, Ltd.; OSCAL manufactured by Shokubai Kasei Kogyo Co., Ltd.; Quartron (registered trademark) manufactured by Fuso Chemical Co., Ltd.; Highlink (registered trademark) OG Silica Organosol manufactured by Clariant Japan K.K.; and the like.

In the composition of the present invention, it is preferable to use an organosilica sol obtained by substituting an aqueous silica sol using a hydrophilic solvent such as alcohol and the like. In the organosilica sol derived from the aqueous silica sol, an amount of hydroxyl groups on a surface of the silica becomes sufficient. Therefore, when the low refractive index layer of the melamine decorative board is formed using the composition of the present invention, adhesion between the low refractive index layer and the melamine layer is promoted, and surface durability of the melamine decorative board is thereby improved. When the organosilica sol is dispersed in a hydrophobic solvent, a surface of the organosilica sol is hydrophobized in order to stabilize the organosilica sol. In such an organosilica sol, the silica does not have a sufficient amount of hydroxyl groups on the surface thereof, and adhesion between the low refractive index layer and the melamine layer is likely to be inferior.

Here, the hydrophilic (polar) solvent refers to a solvent having an affinity with water. An example thereof is a hydrophilic organic solvent including, in a molecule thereof, a hydrophilic group such as a hydroxyl group, a carboxyl group, a carbonyl group and the like. The hydrophilic (polar) solvent includes a protic polar solvent and an aprotic polar solvent. Specific examples of the protic polar solvent include alcohol-based solvent such as methyl alcohol, ethyl alcohol, isopropyl alcohol, ethylene dialcohol, propanol and the like; and cellosolve-based solvent such as methyl cellosolve, ethyl cellosolve, butyl cellosolve, n-propyl cellosolve and the like. Specific examples of the aprotic polar solvent include acetone, dimethyl sulfoxide (DMSO), N,N-dimethyl formamide (DMF), pyridine and the like.

In the composition of the present invention, it is preferable to set a mixing ratio between the component (a) and the component (b1) so that an amount of the component (a) is 4-18 parts by weight (in solid equivalent) per part by weight of the component (b1) (in solid equivalent). By setting the amount of the component (a) to 4 or more parts by weight, the amount of hydroxyl groups on the surface of the silica becomes sufficient. Thus, the adhesion between the low refractive index layer and the melamine layer is promoted, and the surface durability of the melamine decorative board is thereby improved. Further, by setting the amount of the component (a) to 18 or less parts by weight, the amount of the component (b1) does not become too small. As a result, on a surface of the melamine decorative board, a fingerprint becomes still less noticeable, and a pattern on a printed paper becomes still clearer.

In the composition of the present invention, it is preferable to set a mixing ratio between the component (a) and the component (b2) so that an amount of the component (a) is 4-18 parts by weight (in solid equivalent) per part by weight of the component (b2) (in solid equivalent). By setting the amount of the component (a) to 4 or more parts by weight, the amount of hydroxyl groups on the surface of the silica becomes sufficient. Thus, the adhesion between the low refractive index layer and the melamine layer is promoted, and surface durability of the melamine decorative board is thereby improved. Further, by setting the amount of the component (a) to 18 or less parts by weight, the amount of the component (b2) does not become too small. As a result, on the surface of the melamine decorative board, the fingerprint becomes still less noticeable, and the pattern on the printed paper becomes still clearer.

Examples of base material used as a transfer sheet of the present invention include a plastic film and a metallic foil. As a plastic film, for example, a polyester film, a polyethylene film, a polypropylene film, a cellophane, a diacetylcellulose film, a triacetylcellulose film, an acetylcellulose butyrate film, a polyvinyl chloride film, a polyvinylidene chloride film, a polyvinyl alcohol film, an ethylene vinyl alcohol film, a polystyrene film, a polycarbonate film, a polymethylpentene film, a polysulfone film, a polyether ketone film, a polyether sulfone film, a polyetherimide film, a polyimide film, a fluororesin film, a nylon film, an acrylic film and the like can be used.

As a metallic foil, for example, a gold foil, a silver foil, a copper foil, a zinc foil, an indium foil, an aluminum foil, a tin foil, an iron foil (including a stainless steel (SUS) foil), a titanium foil and the like can be used.

The transfer sheet of the present invention can be produced, for example, by applying the composition to the base material. As an applying method, known methods, for example, a spray coat method, a gravure coat method, a bar coat method, a knife coat method, a roll coat method, a blade coat method, a die coat method, a curtain coat method, a reverse coat method, a comma coat method and the like can be employed. The transfer sheet obtained through such methods is stacked on a melamine resin impregnated paper (e.g., a melamine resin impregnated pattern paper and a melamine resin impregnated overlay paper) so that a composition-applied surface comes in contact with the melamine resin impregnated paper. Then, heat and pressure are applied to the stacked transfer sheet and the melamine resin impregnated paper together with a core material.

A thickness (after dried) of the low refractive index layer formed using the composition of the present invention is preferably in a range of 0.5-15 μm when the composition is composed of the component (a) and the component (b1). By setting the thickness within this range, a refractive index of the low refractive index layer easily becomes 1.5 or less. By setting the film thickness to 0.5 μm or more, the fingerprint becomes still less noticeable, and the pattern on the printed paper becomes still clearer on the surface of the melamine decorative board. Further, by setting the film thickness to 15 μm or less, whitening of the low refractive layer is less likely to occur, and an appearance of the melamine decorative board becomes excellent.

The thickness (after dried) of the low refractive index layer formed using the composition of the present invention is preferably in a range of 0.5-15 μm when the composition is composed of the component (a) and the component (b2). By setting the thickness within this range, the refractive index of the low refractive index layer easily becomes 1.5 or less. By setting the film thickness to 0.5 μm or more, the fingerprint becomes still less noticeable, and the pattern on the printed paper becomes still clearer on the surface of the melamine decorative board. Further, by setting the film thickness to 15 μm or less, whitening of the low refractive layer is less likely to occur, and the appearance of the melamine decorative board becomes excellent.

In the melamine decorative board of the present invention and a method for producing the melamine decorative board of the present invention, the melamine resin impregnated paper (the melamine resin impregnated pattern paper) may be used. The melamine resin impregnated paper is obtained, for example, by impregnating a decorative paper for use in a decorative board with a resin liquid composed primarily of melamine-formaldehyde resin and drying the impregnated decorative paper. A basis weight of the decorative paper for use in a decorative board is preferably, for example, in a range of about 80-140 g/m$^2$. A degree of impregnation of the resin liquid, which is defined by a following mathematical formula 1, is preferably in a range of 70-160%, for example.

[Mathematical formula 1]

$$\text{Degree of impregnation (\%)} = \frac{\text{Weight after impregnation} - \text{Weight before impregnation}}{\text{Weight before impregnation}} \times 100$$

In the melamine decorative board of the present invention and the method for producing the melamine decorative board of the present invention, in order to improve abrasion resistance on the surface of the melamine decorative board, the melamine resin impregnated overlay paper may be stacked as an uppermost layer (excluding the low refractive index layer) and heat and pressure may be applied to the stacked body. The melamine resin impregnated overlay paper is obtained, for example, by impregnating an overlay base paper having a basis weight of about 20-60 g/m$^2$ with a resin liquid composed primarily of melamine-formaldehyde resin at a degree of impregnation of 200-400%, and drying the impregnated overlay base paper.

In the melamine decorative board of the present invention and the method for producing the melamine decorative board of the present invention, a core material may be used. The core material is obtained, for example, by impregnating a kraft paper with a resin liquid composed primarily of phenol-formaldehyde resin and drying the impregnated kraft paper. A basis weight of the kraft paper is preferably, for example, in a range of about 150-300 g/m$^2$. A degree of impregnation of the resin liquid, which is defined by the above mathematical formula 1, is preferably in a range of 30-80%, for example.

The present invention will hereinafter be described by Embodiments, Experimental Examples, and Comparative Examples, which do not limit the present invention in any way.

Embodiment 1

1. Production of a Composition

One part by weight (in solid equivalent) of a siloxane graft-type polymer was mixed with 10 parts by weight (in solid equivalent) of an organosilica sol. As the siloxane graft-type polymer, ZX-022H (hydroxyl value: 120, acid value: 0, solvent species: xylene/butyl acetate/isopropanol, manufactured by Fuji Kasei Kogyo Co., Ltd.) obtained by compositing fluorine resin with siloxane was used. As the organosilica sol, IPA-ST (isopropanol dispersion silica sol, average particle diameter: 10-20 nm, $SiO_2$: 30% by weight, manufactured by Nissan Chemical Industries, Ltd.) was used. IPA-ST is an organosilica sol in which a hydrophilic solvent (isopropanol) is used.

The above mixture was diluted with isopropanol so that a total solid content became 20% by weight, and a composition was obtained.

2. Production of a Transfer Sheet

The above composition was uniformly applied to an OPP film having a thickness of 30 μm by a bar coat method so that an after-dried film thickness of the composition became 3 μm. The OPP film was dried to obtain a transfer sheet 1. In the transfer sheet 1, a layer composed of dried product of the above composition was formed on the OPP film.

3. Production of a Melamine Decorative Board

An overlay paper having a basis weight of 40 g/m$^2$ for use in a decorative board was impregnated with a resin liquid composed primarily of melamine-formaldehyde resin. A degree of impregnation of the resin liquid was set to 300% according to a calculating method defined by the above mathematical formula 1. The impregnated overlay paper was dried to obtain a melamine resin impregnated overlay paper 2.

A black decorative paper having a basis weight of 100 g/m$^2$ for use in a decorative board was impregnated with a resin liquid composed primarily of melamine-formaldehyde resin. A degree of impregnation of the resin liquid was set to 100% according to the calculating method defined by the above mathematical formula 1. The impregnated decorative paper was dried to obtain a melamine resin impregnated decorative paper 3.

A kraft paper having a basis weight of 200 g/m$^2$ was impregnated with a resin liquid composed primarily of phenol-formaldehyde resin. A degree of impregnation of the resin liquid was set to 50% according to the calculating method defined by the above mathematical formula 1. The impregnated kraft paper was dried to obtain a phenol resin impregnated core paper 4.

Figure 2:
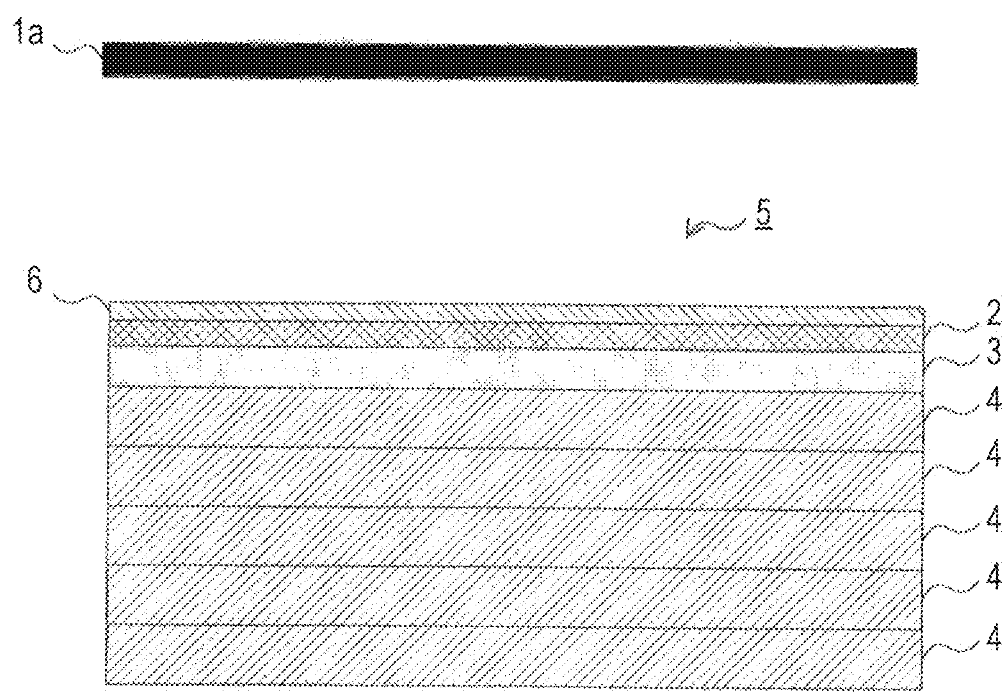
FIG. 2 is a sectional side view showing a structure of the melamine decorative board.

As shown in FIG. 1, five sheets of the phenol resin impregnated core paper 4, a sheet of the melamine resin impregnated decorative paper 3, a sheet of the melamine resin impregnated overlay paper 2, and a sheet of the transfer sheet were stacked in this order. The transfer sheet 1, which includes an OPP film 1*a* and a dried film 1*b* of the composition, was stacked so that the dried film 1*b* came in contact with the melamine resin impregnated overlay paper 2. Heat and pressure are applied to the stacked body at a temperature of 135° C. and a pressure of 8 MPa for 80 minutes. Then, the OPP film 1*a* was removed to obtain a melamine decorative board 5 as shown in FIG. 2. A low refractive index layer 6 composed of a cured product of the composition was formed on a surface of the melamine decorative board 5. The low refractive index layer 6 was generated from the dried film 1*b* of the composition.

Embodiment 2

A transfer sheet was produced in the same manner as in Embodiment 1 except that the after-dried film thickness of the composition (a thickness of the low refractive index layer) on the transfer sheet was set to 0.5 μm. Further, a melamine decorative board having the low refractive index layer formed on a surface thereof was produced in the same manner as in Embodiment 1 except that the above transfer sheet was used.

Embodiment 3

A transfer sheet was produced in the same manner as in Embodiment 1 except that the after-dried film thickness of the composition (a thickness of the low refractive index layer) on the transfer sheet was set to 15 μm. Further, a melamine decorative board having the low refractive index layer formed on a surface thereof was produced in the same manner as in Embodiment 1 except that the above transfer sheet was used.

Embodiment 4

A composition was produced in the same manner as in Embodiment 1 except that a mixing ratio between the siloxane graft-type polymer and the organosilica sol was set as follows:

the siloxane graft-type polymer: 1 part by weight (in solid equivalent)

the organosilica sol: 4 parts by weight (in solid equivalent)

Further, a transfer sheet and a melamine decorative board having a low refractive index layer formed on a surface thereof were produced in the same manner as in Embodiment 1 except that the above composition was used.

Embodiment 5

A composition was produced in the same manner as in Embodiment 1 except that the mixing ratio between the siloxane graft-type polymer and the organosilica sol was set as follows:

the siloxane graft-type polymer: 1 part by weight (in solid equivalent)

the organosilica sol: 6 parts by weight (in solid equivalent)

Further, a transfer sheet and a melamine decorative board having a low refractive index layer formed on a surface thereof were produced in the same manner as in Embodiment 1 except that the above composition was used.

Embodiment 6

A composition was produced in the same manner as in Embodiment 1 except that the mixing ratio between the siloxane graft-type polymer and the organosilica sol was set as follows:

the siloxane graft-type polymer: 1 part by weight (in solid equivalent)

the organosilica sol: 14 parts by weight (in solid equivalent)

Further, a transfer sheet and a melamine decorative board having a low refractive index layer formed on a surface thereof were produced in the same manner as in Embodiment 1 except that the above composition was used.

Embodiment 7

A composition was produced in the same manner as in Embodiment 1 except that the mixing ratio between the siloxane graft-type polymer and the organosilica sol was set as follows:

the siloxane graft-type polymer: 1 part by weight (in solid equivalent)

the organosilica sol: 18 parts by weight (in solid equivalent)

Further, a transfer sheet and a melamine decorative board having a low refractive index layer formed on a surface thereof were produced in the same manner as in Embodiment 1 except that the above composition was used.

Embodiment 8

A composition was produced in the same manner as in Embodiment 1 except that, instead of IPA-ST, the same amount of methanol silica sol (methanol dispersion silica sol, average particle diameter: 10-20 nm, $SiO_2$: 30% by weight, manufactured by Nissan Chemical Industries, Ltd.) was used as an organosilica sol. The methanol silica sol is an organosilica sol in which a hydrophilic solvent (methanol) is used.

Further, a transfer sheet and a melamine decorative board having a low refractive index layer formed on a surface thereof were produced in the same manner as in Embodiment 1 except that the above composition was used.

Embodiment 9

A composition was produced in the same manner as in Embodiment 1 except that, instead of IPA-ST, the same amount of NPC-ST-30 (average particle diameter: 10-20 nm, n-propyl cellosolve dispersion silica sol, $SiO_2$: 30% by weight, manufactured by Nissan Chemical Industries, Ltd.) was used as an organosilica sol. NPC-ST-30 is an organosilica sol in which a hydrophilic solvent (n-propyl cellosolve) is used.

Further, a transfer sheet and a melamine decorative board having a low refractive index layer formed on a surface thereof were produced in the same manner as in Embodiment 1 except that the above composition was used.

Embodiment 10

A composition was produced in the same manner as in Embodiment 1 except that, instead of ZX-022H, the same amount of a siloxane graft-type polymer ZX-007C (hydroxyl value: 58, acid value: 5, solvent species: xylene/butyl acetate, manufactured by Fuji Kasei Kogyo Co., Ltd.) obtained by compositing fluorine resin with siloxane was used as a siloxane graft-type polymer. Further, a transfer sheet and a melamine decorative board having a low refractive index layer formed on a surface thereof were produced in the same manner as in Embodiment 1 except that the above composition was used.

Embodiment 11

A composition was produced in the same manner as in Embodiment 1 except that, instead of ZX-022H, the same amount of a siloxane graft-type polymer ZX-001 (hydroxyl value: 94, acid value: 0, solvent species: xylene/isobutanol, manufactured by Fuji Kasei Kogyo Co., Ltd.) obtained by compositing fluorine resin with siloxane was used as a siloxane graft-type polymer. Further, a transfer sheet and a melamine decorative board having a low refractive index layer formed on a surface thereof were produced in the same manner as in Embodiment 1 except that the above composition was used.

Embodiment 12

A composition was produced in the same manner as in Embodiment 1 except that, instead of ZX-022H, the same amount of a siloxane graft-type polymer ZX-022 (hydroxyl value: 120, acid value: 5, solvent species: xylene/butyl acetate, manufactured by Fuji Kasei Kogyo Co., Ltd.) obtained by compositing fluorine resin with siloxane was used as a siloxane graft-type polymer. Further, a transfer sheet and a melamine decorative board having a low refractive index layer formed on a surface thereof were produced in the same manner as in Embodiment 1 except that the above composition was used.

Embodiment 13

A composition was produced in the same manner as in Embodiment 1 except that, instead of ZX-022H, the same amount of a siloxane graft-type polymer ZX-028-R (hydroxyl value: 100, acid value: 5, solvent species: butyl acetate, manufactured by Fuji Kasei Kogyo Co., Ltd.) obtained by compositing acrylic resin with siloxane was used as a siloxane graft-type polymer. Further, a transfer sheet and a melamine decorative board having a low refractive index layer formed on a surface thereof were produced in the same manner as in Embodiment 1 except that the above composition was used.

Embodiment 14

A composition was produced in the same manner as in Embodiment 1 except that, instead of ZX-022H, the same amount of a siloxane graft-type polymer ZX-036 (hydroxyl value: 119, solvent species: butyl acetate/2-propanol, manufactured by Fuji Kasei Kogyo Co., Ltd.) obtained by compositing acrylic resin with siloxane was used as a siloxane graft-type polymer. Further, a transfer sheet and a melamine decorative board having a low refractive index layer formed on a surface thereof were produced in the same manner as in Embodiment 1 except that the above composition was used.

Embodiment 15

1. Production of a Composition

One part by weight (in solid equivalent) of a cold glass coating agent was mixed with 10 parts by weight (in solid equivalent) of an organosilica sol. As the cold glass coating agent, one-component coating agent (commercial name: Siragusital A6200 manufactured by Bokuto Kasei Kogyo Co., Ltd.) was used. The cold glass coating agent is obtained by mixing alcohol-soluble organic silicon compound ($Si(OR)_4$) with alcohol and the like (isopropanol), and adding thereto boron ion $B^{3+}$ and halogen ion $F^-$ as catalysts to adjust pH to 4.5-5.0. As the organosilica sol, IPA-ST (isopropanol dispersion silica sol, average particle diameter: 10-20 nm, $SiO_2$: 30% by weight, manufactured by Nissan Chemical Industries, Ltd.) was used.

The above mixture was diluted with isopropanol so that a total solid content became 20% by weight, and a composition was obtained.

2. Production of a Transfer Sheet

The above composition was applied to an OPP film having a thickness of 30 μm by a bar coat method so that an after-dried film thickness of the composition became 3 μm. The OPP film was dried to obtain a transfer sheet 11.

3. Production of a Melamine Decorative Board

Using the transfer sheet 11, a melamine decorative board having a low refractive index layer formed on a surface thereof was produced in the same manner as in Embodiment 1 (see FIG. 1).

Embodiment 16

A transfer sheet was produced in the same manner as in Embodiment 15 except that the after-dried film thickness of the composition (a thickness of the low refractive index layer) on the transfer sheet was set to 0.5 μm. Further, a melamine decorative board having the low refractive index layer formed on a surface thereof was produced in the same manner as in Embodiment 15 except that the above transfer sheet was used.

Embodiment 17

A transfer sheet was produced in the same manner as in Embodiment 15 except that the after-dried film thickness of the composition (a thickness of the low refractive index layer) on the transfer sheet was set to 15 μm. Further, a melamine decorative board having the low refractive index layer formed on a surface thereof was produced in the same manner as in Embodiment 15 except that the above transfer sheet was used.

Embodiment 18

A composition was produced in the same manner as in Embodiment 15 except that a mixing ratio between the cold glass coating agent and the organosilica sol was set as follows:

the cold glass coating agent: 1 part by weight (in solid equivalent)

the organosilica sol: 4 parts by weight (in solid equivalent)

Further, a transfer sheet and a melamine decorative board having a low refractive index layer formed on a surface thereof were produced in the same manner as in Embodiment 15 except that the above composition was used.

Embodiment 19

A composition was produced in the same manner as in Embodiment 15 except that the mixing ratio between the cold glass coating agent and the organosilica sol was set as follows:

the cold glass coating agent: 1 part by weight (in solid equivalent)

the organosilica sol: 6 parts by weight (in solid equivalent)

Further, a transfer sheet and a melamine decorative board having a low refractive index layer formed on a surface thereof were produced in the same manner as in Embodiment 15 except that the above composition was used.

Embodiment 20

A composition was produced in the same manner as in Embodiment 15 except that the mixing ratio between the cold glass coating agent and the organosilica sol was set as follows:

the cold glass coating agent: 1 part by weight (in solid equivalent)

the organosilica sol: 14 parts by weight (in solid equivalent)

Further, a transfer sheet and a melamine decorative board having a low refractive index layer formed on a surface thereof were produced in the same manner as in Embodiment 15 except that the above composition was used.

Embodiment 21

A composition was produced in the same manner as in Embodiment 15 except that the mixing ratio between the cold glass coating agent and the organosilica sol was set as follows:

the cold glass coating agent: 1 part by weight (in solid equivalent)

the organosilica sol: 18 parts by weight (in solid equivalent)

Further, a transfer sheet and a melamine decorative board having a low refractive index layer formed on a surface thereof were produced in the same manner as in Embodiment 15 except that the above composition was used.

Embodiment 22

A composition was produced in the same manner as in Embodiment 15 except that, instead of IPA-ST, the same amount of methanol silica sol (methanol dispersion silica sol, manufactured by Nissan Chemical Industries, Ltd.) was used as an organosilica sol. Further, a transfer sheet and a melamine decorative board having a low refractive index layer formed on a surface thereof were produced in the same manner as in Embodiment 15 except that the above composition was used.

Embodiment 23

A composition was produced in the same manner as in Embodiment 15 except that, instead of IPA-ST, the same amount of NPC-ST-30 (n-propyl cellosolve dispersion silica sol, manufactured by Nissan Chemical Industries, Ltd.) was used as an organosilica sol. Further, a transfer sheet and a melamine decorative board having a low refractive index layer formed on a surface thereof were produced in the same manner as in Embodiment 15 except that the above composition was used.

Embodiment 24

A composition was produced in the same manner as in Embodiment 15 except that, instead of Siragusital A6200, the same amount of Siragusital B4373(BN) (manufactured by Bokuto Kasei Kogyo Co., Ltd.) was used as a cold glass coating agent. Siragusital B4373(BN) is a two-component coating agent containing alcohol-soluble organic silicon compound ($Si(OR)_4$) as a base compound and boron ion $B^{3+}$and halogen ion $X^-$ as catalysts. The base compound and the catalysts are mixed at a ratio of 10 parts by weight of the base compound to 1 part by weight of the catalysts, and are used after diluted with a diluting solvent to an arbitrary concentration.

Further, a transfer sheet and a melamine decorative board having a low refractive index layer formed on a surface thereof were produced in the same manner as in Embodiment 15 except that the above composition was used.

EXPERIMENTAL EXAMPLE 1

A composition was produced in the same manner as in Embodiment 1 except that the mixing ratio between the siloxane graft-type polymer and the organosilica sol was set as follows:

the siloxane graft-type polymer: 1 part by weight (in solid equivalent)

the organosilica sol: 3 parts by weight (in solid equivalent)

Further, a transfer sheet and a melamine decorative board having a low refractive index layer formed on a surface thereof were produced in the same manner as in Embodiment 1 except that the above composition was used.

EXPERIMENTAL EXAMPLE 2

A composition was produced in the same manner as in Embodiment 1 except that the mixing ratio between the siloxane graft-type polymer and the organosilica sol was set as follows:

the siloxane graft-type polymer: 1 part by weight (in solid equivalent)

the organosilica sol: 20 parts by weight (in solid equivalent)

Further, a transfer sheet and a melamine decorative board having a low refractive index layer formed on a surface thereof were produced in the same manner as in Embodiment 1 except that the above composition was used.

EXPERIMENTAL EXAMPLE 3

A composition was produced in the same manner as in Embodiment 1 except that, instead of IPA-ST, the same amount of nBAC-ST (butyl acetate dispersion silica sol, manufactured by Nissan Chemical Industries, Ltd.) was used as an organosilica sol. nBAC-ST is an organosilica sol, solvent species of which is hydrophobic.

Further, a transfer sheet and a melamine decorative board having a low refractive index layer formed on a surface thereof were produced in the same manner as in Embodiment 1 except that the above composition was used.

EXPERIMENTAL EXAMPLE 4

A composition was produced in the same manner as in Embodiment 15 except that the mixing ratio between the cold glass coating agent and the organosilica sol was set as follows:

the cold glass coating agent: 1 part by weight (in solid equivalent)

the organosilica sol: 3 parts by weight (in solid equivalent)

Further, a transfer sheet and a melamine decorative board having a low refractive index layer formed on a surface thereof were produced in the same manner as in Embodiment 15 except that the above composition was used.

EXPERIMENTAL EXAMPLE 5

A composition was produced in the same manner as in Embodiment 15 except that the mixing ratio between the cold glass coating agent and the organosilica sol was set as follows:

the cold glass coating agent: 1 part by weight (in solid equivalent)

the organosilica sol: 20 parts by weight (in solid equivalent)

Further, a transfer sheet and a melamine decorative board having a low refractive index layer formed on a surface thereof were produced in the same manner as in Embodiment 15 except that the above composition was used.

EXPERIMENTAL EXAMPLE 6

A composition was produced in the same manner as in Embodiment 15 except that, instead of IPA-ST, the same amount of nBAC-ST (butyl acetate dispersion silica sol, manufactured by Nissan Chemical Industries, Ltd.) was used as an organosilica sol. nBAC-ST is an organosilica sol, solvent species of which is hydrophobic.

Further, a transfer sheet and a melamine decorative board having a low refractive index layer formed on a surface thereof were produced in the same manner as in Embodiment 15 except that the above composition was used.

COMPARATIVE EXAMPLE 1

Five sheets of the phenol resin impregnated core paper, a sheet of the melamine resin impregnated decorative paper, and a sheet of the melamine resin impregnated overlay paper were stacked, and heat and pressure are applied thereto at a temperature of 135° C. and a pressure of 8 MPa for 80 minutes to obtain a melamine decorative board. Each of the phenol resin impregnated core paper, the melamine resin impregnated decorative paper, and the melamine resin impregnated overlay paper is the same as that in Embodiment 1.

Then, the melamine decorative boards produced in Embodiments 1-24, Experimental Examples 1-6, and Comparative Example 1 were evaluated.

(Evaluation Method)

(i) Evaluation of Anti-Fingerprint Property Using an Actual Fingerprint

An actual fingerprint was attached on a surface of each melamine decorative board, and it was visually evaluated how noticeable the fingerprint was. Evaluation criteria are as follows:

○: The fingerprint is not noticeable

Δ: The fingerprint is slightly noticeable x: The fingerprint is noticeable (ii) Clarity Clarity of the decorative paper of the melamine decorative board was visually observed under oblique light. Evaluation criteria are as follows:

○: The decorative paper can be clearly observed

Δ: Reflection of lights and white blur are slightly observed (iii) Surface Durability (1)

A surface of each melamine decorative board was wiped back and forth 100 times by dry cotton waste under a load of about 300 g/cm$^2$, and change in gloss level on the surface was visually evaluated. Evaluation criteria are as follows:

○: Change in gloss level is not observed

Δ: Change in gloss level is slightly observed x: Change in gloss level is observed (iv) Surface Durability (2)

The surface of each melamine decorative board was wiped back and forth by dry cotton waste under a load of about 1 kg/cm$^2$, and change in gloss level on the surface was visually evaluated. Evaluation criteria are as follows:

5: Change in gloss level is not observed when or before the surface was wiped back and forth 500 times 4: Change in gloss level is observed when or before the surface was wiped back and forth 400 times 3: Change in gloss level is observed when or before the surface was wiped back and forth 300 times 2: Change in gloss level is observed when or before the surface was wiped back and forth 200 times 1; Change in gloss level is observed when or before the surface was wiped back and forth 100 times (v) Refractive Index A refractive index on the surface of each melamine decorative board was measured with multi-wavelength Abbe refractometer (DR-M2, manufactured by Atago Co., Ltd.). Refractive index was measured at a wavelength of 589 nm.

(vi) Surface Hardness

Surface hardness of each melamine decorative board was measured under a load of 1 kg according to JIS K 5600; 1999 (general testing methods for paints).

(vii) Abrasion Resistance

Abrasion resistance of the surface of each melamine decorative board was measured according to JIS K 6902; 1998 (testing method for laminated thermosetting high-pressure decorative sheets)

(Evaluation Results)

Tables 1 and 2 show the evaluation results. In Table 1, "(b1):(a)" represents a weight ratio (in solid equivalent) between the siloxane graft-type polymer (b1) and the organosilica sol (a). In Table 2, "(b2):(a)" represents a weight ratio (in solid equivalent) between the cold glass coating agent (b2) and the organosilica sol (a).

TABLE 1

| | siloxane graft-type polymer (b1) | organo-silica sol (a) | (b1):(a) | after-dried thickness [μm] | appear-ance | anti-finger-print property | clarity | surface durability (1) | surface durability (2) | refractive index | surface hardness | abrasion resistance abrasion value [times] |
|---|---|---|---|---|---|---|---|---|---|---|---|---|
| Embodiment 1 | ZX-022H | IPA-ST | 1:10 | 3 | ○ | ○ | ○ | ○ | 5 | 1.48 | 9H | 610 |
| Embodiment 2 | ZX-022H | IPA-ST | 1:10 | 0.5 | ○ | ○ | ○ | ○ | 5 | 1.48 | 9H | 590 |
| Embodiment 3 | ZX-022H | IPA-ST | 1:10 | 15 | ○ | ○ | ○ | ○ | 5 | 1.47 | 9H | 630 |
| Embodiment 4 | ZX-022H | IPA-ST | 1:4 | 3 | ○ | ○ | ○ | ○ | 5 | 1.48 | 7H | 620 |
| Embodiment 5 | ZX-022H | IPA-ST | 1:6 | 3 | ○ | ○ | ○ | ○ | 5 | 1.46 | 8H | 610 |
| Embodiment 6 | ZX-022H | IPA-ST | 1:14 | 3 | ○ | ○ | ○ | ○ | 5 | 1.47 | 9H | 610 |
| Embodiment 7 | ZX-022H | IPA-ST | 1:18 | 3 | ○ | ○ | ○ | ○ | 5 | 1.46 | 9H | 600 |
| Embodiment 8 | ZX-022H | methanol silica sol | 1:10 | 3 | ○ | ○ | ○ | ○ | 5 | 1.47 | 9H | 600 |
| Embodiment 9 | ZX-022H | NPC-ST-30 | 1:10 | 3 | ○ | ○ | ○ | ○ | 5 | 1.48 | 9H | 600 |
| Embodiment 10 | ZX-007C | IPA-ST | 1:10 | 3 | ○ | ○ | ○ | ○ | 5 | 1.47 | 8H | 610 |
| Embodiment 11 | ZX-001 | IPA-ST | 1:10 | 3 | ○ | ○ | ○ | ○ | 5 | 1.47 | 9H | 610 |
| Embodiment 12 | ZX-022 | IPA-ST | 1:10 | 3 | ○ | ○ | ○ | ○ | 5 | 1.48 | 8H | 620 |
| Embodiment 13 | ZX-028-R | IPA-ST | 1:10 | 3 | ○ | ○ | ○ | ○ | 5 | 1.48 | 9H | 620 |
| Embodiment 14 | ZX-036 | IPA-ST | 1:10 | 3 | ○ | ○ | ○ | ○ | 5 | 1.48 | 9H | 630 |

TABLE 2

| | cold glass coating agent (b2) | organo-silica sol (a) | (b2):(a) | after-dried thickness [μm] | appear-ance | anti-finger-print property | clarity | surface durability (1) | surface durability (2) | refractive index | surface hardness | abrasion resistance abrasion value [times] |
|---|---|---|---|---|---|---|---|---|---|---|---|---|
| Embodiment 15 | Siragusital A6200 | IPA-ST | 1:10 | 3 | ○ | ○ | ○ | ○ | 5 | 1.46 | 9H | 590 |
| Embodiment 16 | Siragusital A6200 | IPA-ST | 1:10 | 0.5 | ○ | ○ | ○ | ○ | 5 | 1.48 | 9H | 580 |
| Embodiment 17 | Siragusital A6200 | IPA-ST | 1:10 | 15 | ○ | ○ | ○ | ○ | 5 | 1.47 | 9H | 610 |

TABLE 2-continued

| | cold glass coating agent (b2) | organo-silica sol (a) | (b2):(a) | after-dried thickness [μm] | appear-ance | anti-finger-print property | clarity | surface durability (1) | surface durability (2) | refractive index | surface hardness | abrasion resistance abrasion value [times] |
|---|---|---|---|---|---|---|---|---|---|---|---|---|
| Embodiment 18 | Siragusital A6200 | IPA-ST | 1:4 | 3 | ○ | ○ | ○ | ○ | 5 | 1.48 | 9H | 590 |
| Embodiment 19 | Siragusital A6200 | IPA-ST | 1:6 | 3 | ○ | ○ | ○ | ○ | 5 | 1.48 | 9H | 600 |
| Embodiment 20 | Siragusital A6200 | IPA-ST | 1:14 | 3 | ○ | ○ | ○ | ○ | 5 | 1.47 | 9H | 600 |
| Embodiment 21 | Siragusital A6200 | IPA-ST | 1:18 | 3 | ○ | ○ | ○ | ○ | 5 | 1.46 | 9H | 610 |
| Embodiment 22 | Siragusital A6200 | methanol silica sol | 1:10 | 3 | ○ | ○ | ○ | ○ | 5 | 1.46 | 9H | 580 |
| Embodiment 23 | Siragusital A6200 | NPC-ST-30 | 1:10 | 3 | ○ | ○ | ○ | ○ | 5 | 1.48 | 9H | 600 |
| Embodiment 24 | Siragusital B4373(BN) | IPA-ST | 1:10 | 3 | ○ | ○ | ○ | ○ | 5 | 1.47 | 9H | 610 |
| Experimental Example 1 | ZX-022H | IPA-ST | 1:3 | 3 | ○ | ○ | ○ | Δ | 1 | 1.46 | 7H | 600 |
| Experimental Example 2 | ZX-022H | IPA-ST | 1:20 | 3 | ○ | Δ | Δ | ○ | 5 | 1.47 | 9H | 600 |
| Experimental Example 3 | ZX-022H | nBAC-ST | 1:10 | 3 | ○ | ○ | ○ | x | 1 | 1.48 | <H | 610 |
| Experimental Example 4 | Siragusital A6200 | IPA-ST | 1:3 | 3 | ○ | ○ | ○ | Δ | 1 | 1.48 | 7H | 600 |
| Experimental Example 5 | Siragusital A6200 | IPA-ST | 1:20 | 3 | ○ | Δ | Δ | ○ | 5 | 1.47 | 9H | 610 |
| Experimental Example 6 | Siragusital A6200 | nBAC-ST | 1:10 | 3 | ○ | ○ | ○ | x | 1 | 1.48 | <H | 600 |
| Comparative Example 1 | melamine decorative board | | | — | ○ | x | x | — | — | 1.66 | 9H | 580 |

As shown in Tables 1 and 2, in the melamine decorative boards of Embodiments 1-24, a fingerprint was less noticeable, and a printed pattern had high clarity. Moreover, the melamine decorative boards of Embodiments 1-24 exhibited high surface durability, high surface hardness, and high abrasion resistance. In contrast, in the melamine decorative board of Comparative Example 1, a fingerprint was noticeable, and a printed pattern had low clarity.

Figure 3:
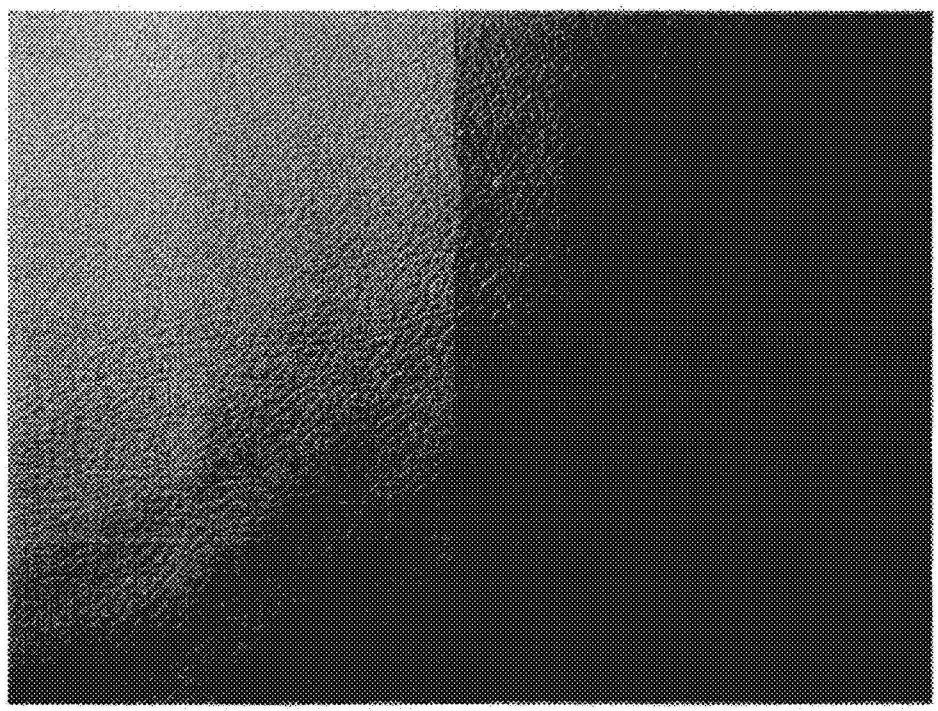
FIG. 3 is a photograph showing clarity on a surface of the melamine decorative board. A right half corresponds to a melamine decorative board of Embodiment 1, and a left half corresponds to a melamine decorative board of Comparative example 1.

FIG. 3 is a photograph showing surface conditions of the melamine decorative boards of Embodiment 1 and Comparative Example 1. A right half of the photograph corresponds to the melamine decorative board of Embodiment 1, and a left half corresponds to the melamine decorative board of Comparative Example 1. As is clear from this photograph, in the melamine decorative board of Embodiment 1, the decorative paper had a high clarity, whereas the melamine decorative board of Comparative Example 1 was whitish and a decorative paper thereof had low clarity.

Figure 4:
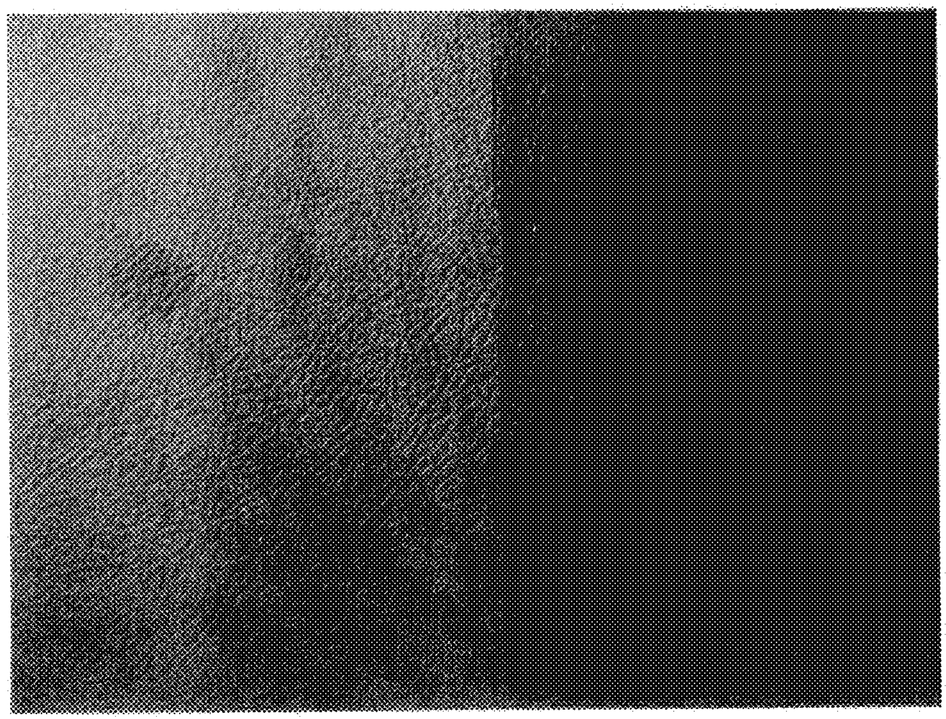
FIG. 4 is a photograph showing to what degree a fingerprint adheres onto the surface of the melamine decorative board. A right half corresponds to the melamine decorative board of Embodiment 1, and a left half corresponds to the melamine decorative board of Comparative example 1.

FIG. 4 is a photograph showing a fingerprint attached on the surface of each melamine decorative boards of Embodiment 1 and Comparative Example 1 when anti-fingerprint property was evaluated using an actual fingerprint. A right half of the photograph corresponds to the melamine decorative board of Embodiment 1, and a left half corresponds to the melamine decorative board of Comparative Example 1. As is clear from this photograph, in the melamine decorative board of Embodiment 1, the fingerprint on the surface thereof was far less noticeable than that on the surface of the melamine decorative board of Comparative Example 1. This is attributed to the fact that the melamine decorative board of Embodiment 1 includes the low refractive index layer 6.

The evaluation result of each of the melamine decorative boards of Experimental Examples 1 and 3 was slightly inferior to that of each of Embodiments 1-24 in surface durability.

The evaluation result of the melamine decorative board of Experimental Example 2 was slightly inferior to that of each of Embodiments 1-24 in anti-fingerprint property and clarity.

The evaluation result of each of the melamine decorative boards of Experimental Examples 4 and 6 was slightly inferior to that of each of Embodiments 1-24 in surface durability and surface hardness.

The evaluation result of the melamine decorative board of Experimental Example 5 was slightly inferior to that of each of Embodiments 1-24 in anti-fingerprint property and clarity.

What is claimed is:

1. A composition comprising:

(a) an organosilica sol; and (b1) a siloxane graft-type polymer obtained by compositing fluorine resin or acrylic resin with siloxane and/or (b2) a cold glass coating agent;

wherein a mixing ratio of a composition of said organosilica sol and said siloxane graft-type polymer is in a range of 4 to 18 parts by weight of organosilica sol per one part by weight of siloxane graft-type polymer; and wherein a mixing ratio of a composition of said organosilica sol and said cold glass coating agent is in a range of 4 to 18 parts by weight of organosilica sol per one part by weight of cold glass coating agent;

and wherein said composition has a refractive index of 1.5 or less when cured.

2. The composition according to claim 1, wherein said mixing ratio of said organosilica sol and said siloxane graft-type polymer is based on solid equivalents of said organosilica sol and said siloxane graft-type polymer, and wherein said mixing ratio of said organosilica sol and said cold glass coating agent is based on solid equivalents of said organosilica sol and said cold glass coating agent.

3. A transfer sheet comprising:

a base material; and a composition disposed on the base material, said composition comprising:

(a) an organosilica sol; and (b1) a siloxane graft-type polymer obtained by compositing fluorine resin or acrylic resin with siloxane and/or (b2) a cold glass coating agent;

wherein a mixing ratio of a composition comprising said organosilica sol and said siloxane graft-type polymer is in a range of 4 to 18 parts by weight of organosilica sol per one part by weight of siloxane graft-type polymer; and wherein a mixing ratio of a composition of said organosilica sol and said cold glass coating agent is in a range of 4 to 18 parts by weight of organosilica sol per one part by weight of cold glass coating agent;

and wherein said composition has a refractive index of 1.5 or less when cured.

4. A method for producing a melamine decorative board, the method comprising steps of:

stacking the transfer sheet according to claim 3, a melamine resin impregnated paper, and a core material;

applying heat and pressure to above stacked body; and removing the base material.

5. The transfer sheet according to claim 3, wherein said mixing ratio of said organosilica sol and said siloxane graft-type polymer is based on solid equivalents of said organosilica sol and said siloxane graft-type polymer, and wherein said mixing ratio of said organosilica sol and said cold glass coating agent is based on solid equivalents of said organosilica sol and said cold glass coating agent.

6. A melamine decorative board comprising:

a core material; and a layer having a refractive index of 1.5 or less formed on a top surface of said core material, said layer being composed of a cured product of a composition, said composition comprising:

(a) an organosilica sol; and (b1) a siloxane graft-type polymer obtained by compositing fluorine resin or acrylic resin with siloxane and/or (b2) a cold glass coating agent;

wherein a mixing ratio of a composition comprising said organosilica sol and said siloxane graft-type polymer is in a range of 4 to 18 parts by weight of organosilica sol per one part by weight of siloxane graft-type polymer; and wherein a mixing ratio of a composition of said organosilica sol and said cold glass coating agent is in a range of 4 to 18 parts by weight of organosilica sol per one part by weight of cold glass coating agent.

7. The melamine decorative board according to claim 6, wherein said mixing ratio of said organosilica sol and said siloxane graft-type polymer is based on solid equivalents of said organosilica sol and said siloxane graft-type polymer, and wherein said mixing ratio of said organosilica sol and said cold glass coating agent is based on solid equivalents of said organosilica sol and said cold glass coating agent.

* * * * *